United States Patent [19]
Bolioli et al.

[11] Patent Number: 5,384,137
[45] Date of Patent: Jan. 24, 1995

[54] PROCESS FOR DRAINING CURD

[75] Inventors: Giuseppe F. Bolioli, Moretta/Cuneo; Giovanni Prella, Vercelli, both of Italy

[73] Assignee: Nestec S.A., Vevey, Switzerland

[21] Appl. No.: 865,303

[22] Filed: Apr. 8, 1992

[30] Foreign Application Priority Data

May 6, 1991 [EP] European Pat. Off. ........ 91107282.5

[51] Int. Cl.⁶ .............................................. A23C 19/02
[52] U.S. Cl. ......................................... 426/36; 426/38; 426/42; 426/43; 426/582
[58] Field of Search ............ 426/34, 36, 38, 42, 426/43, 582

[56] References Cited

U.S. PATENT DOCUMENTS

| | | | |
|---|---|---|---|
| 2,917,827 | 12/1959 | Lankford | 99/348 |
| 4,217,818 | 8/1980 | Hazen | 99/456 |
| 4,309,941 | 1/1982 | Brockwell | 99/453 |

FOREIGN PATENT DOCUMENTS 1150403 4/1969 United Kingdom .

OTHER PUBLICATIONS

Wang et al., Fundamentals of Dairy Chemistry, Third Edition, 1988, pp. 637-649, Van Nostrand Reinhold Company, New York.
Brockwell, "Recent Developments in Cheesemaking Equiptment." The Australian Journal of Dairy Technology, vol. 31, No. 4, pp. 128-133, Dec., 1976.

*Primary Examiner*—Donald E. Czaja
*Assistant Examiner*—Anthony Weier
*Attorney, Agent, or Firm*—Vogt & O'Donnell

[57] ABSTRACT

For preparing a string cheese, curd grains are introduced into a conveyor compartment suitable for statically containing and statically draining the grains while transporting the grains for a time for draining, syneresis and forming of the grains into a pre-cheese loaf.

8 Claims, 2 Drawing Sheets

PROCESS FOR DRAINING CURD

BACKGROUND OF THE INVENTION

This invention relates to a method and an apparatus for continuous drainage of a curd for stringy cheese, particularly Mozzarella.

Among the stringy cheeses, Mozzarella which is a fresh cheese, is hermetically packed in bags in the form of balls immersed in a liquid. Its body is white and fibrous, but spongy in structure, and its taste is delicate, mild and slightly salted.

Traditionally, Mozzarella is made by standardizing the fats content of the milk, pasteurizing the milk, adding lactic cultures based on Streptococcus thermophilus, coagulating the milk with rennet and cutting the curd into grains the size of a hazelnut or a nut. The critical drainage phase of the process is then carried out to give the curd a suitable dry extract degree and a suitable stringing point through the actions of the operators and the lactic fermentation process. The stringing point is the degree of demineralization of the curd which enables the maximum plasticity of the body to be obtained by heating. It is during the drainage phase that the curd recombines to give a "pre-cheese".

The drainage phase has to be carried out slowly with great care. It is carried out in batches in gutters placed on trolleys which involves considerable manual work and takes up considerable floor space. After drainage, the pre-cheese is in the form of loaves which are cut into blocks ready for stringing.

Stringing comprises treating a block of pre-cheese obtained after drainage, which has a clearly defined pH and dry extract degree and which is cut into pieces in hot water, in a kneading trough to obtain a spongy and elastic mass which can easily be dosed, shaped into balls, hardened by immersion in cold water and, finally, packed in bags.

In contrast to the traditional European method, production on an industrial scale carried out mainly in the United States comprises acidification with citric acid which has the advantage, providing the acidification parameters are carefully controlled, of virtually eliminating the need for drainage so that the curd as a whole can be directly subjected to stringing. However, the characteristics of the end product, particularly its pH value of approximately 6, its whitish colour, its insipid taste and its poor keeping properties, which require a distribution circuit cooled to 4°–6° C., distinguish it from the traditional European product which has a pH of 5.1 to 5.2, a slightly yellowish colour, an aromatic taste of fermented milk and good keeping properties cooled to around 8°–10° C.

Although the phases of coagulation and stringing can be carried out continuously, i.e., can be mechanized without difficulty, the same has not hitherto been the case with the drainage phase that is necessary when the technique involves biological acidification, that is to say, solely biological or mixed acidification, i.e., partly with citric acid or lactic acid and partly by the action of lactic ferments.

A process and apparatus for the continuous drainage of curd intended for the production of Cheddar are described in U.S. Pat. No. 4,309,941. The apparatus in question enables a drained curd to be continuously produced under controlled conditions involving movement between fixed vertical walls by means of a system of several conveyors surrounded by an enclosure on which the layer of curd is successively deposited. Close study of this apparatus has shown that it is not suitable for the production of Mozzarella. The formation of a single, more or less thick curd layer, which is subjected to irregular mechanical stresses during its travel under the effect of the traction forces, results in the formation of a skin covering the pre-cheese which prevents progressive drainage and homogeneous demineralization of the pre-cheese leading to a curd drained at the desired pH. In addition, the deposition and transfer of the curd layer are not regular. These conditions are not suitable for stringing.

SUMMARY OF THE INVENTION

The present invention enables continuous drainage and development of the lactic fermentation of a curd for stringy cheese, particularly Mozzarella, to be controlled by providing a process and a mechanized drainage installation.

Accordingly, the present invention provides a method for the production of cheese in which, after inoculation and clotting of the milk, cutting of the curd and separation of the whey, the curd is transferred in the form of grains to an endless chain conveyor on which drainage and lactic fermentation take place continuously and in motion, after which the drained curd is discharged. The process is characterized in that the curd is subjected to static drainage during which loaves are formed in compartments forming the links of the chain which are open on top and on one of their long sides so that static drainage can be carried out under conditions suitable for the formation of a pre-cheese capable of being subjected to stringing while, at the same time, the loaves are transported.

In one embodiment of the method, the curd is rapidly transferred in the form of grains to a first endless elevating chain conveyor from which it is deposited onto a second conveyor, and the loaves formed are then transferred to a third conveyor.

DETAILED DESCRIPTION OF THE INVENTION

According to the invention, static drainage carried out in motion on the second and third conveyors avoids the formation of a single layer of curd surrounded by a substantially impermeable skin. The pre-cheese obtained at the end of the operation has characteristics similar to those of the pre-cheese obtained by the traditional process so that it can be subjected to stringing under good conditions.

This is achieved by the coupled individual elements of the second and third conveyors which form the compartments open on top and in front relative to the direction of travel of the conveyors. During the advance of the conveyors, the compartments which are adjacent form a series of moulds to receive the curd, being separated from one another by slots through which the whey is able to flow. Drainage is thus facilitated by the wall effect of the compartments.

In addition, the transfer and inversion of the loaves from the second to the third conveyor and their transfer from the third conveyor to a table, where they are cut into blocks of the desired size, are supported by curved plates and also by retractable plates superposed between the second and third conveyors in order to soften their fall by gravity.

The present invention also provides an apparatus for the production of cheese comprising a first endless elevating chain conveyor for transferring the curd in the form of grains and discharging the grains. The apparatus is characterized in that it comprises a second horizontal endless chain conveyor and a third horizontal endless conveyor situated beneath the second conveyor and travelling in the opposite direction to the second conveyor for the static drainage and fermentation of the curd and for obtaining a pre-cheese suitable for stringing, transverse compartments which form the links of the chains of the second and third conveyors and which are open on top and on one of their long sides for forming loaves of curd and for the static drainage thereof, means for the supported transfer and inversion of the loaves from the second conveyor to the third conveyor and means for the supported discharge of the loaves from the third conveyor.

Finally, the invention also provides an element forming a chain link of an endless conveyor for the drainage of cheese curd. The element is characterized in that it is in the form of a generally parallelepipedic compartment which is open on top and on one of its long sides, in that the compartment comprises a base consisting of a horizontal rectangular strip curved downwards at its two long sides, vertical plates fixed to the strip at its short sides forming the lateral walls reinforced below the plane of the strip and a vertical plate adjacent the lateral walls forming the rear wall.

An exemplary embodiment of the invention is described in detail in the following with reference to the accompanying drawings.

DETAILED DESCRIPTION OF DRAWINGS

Figure 1:
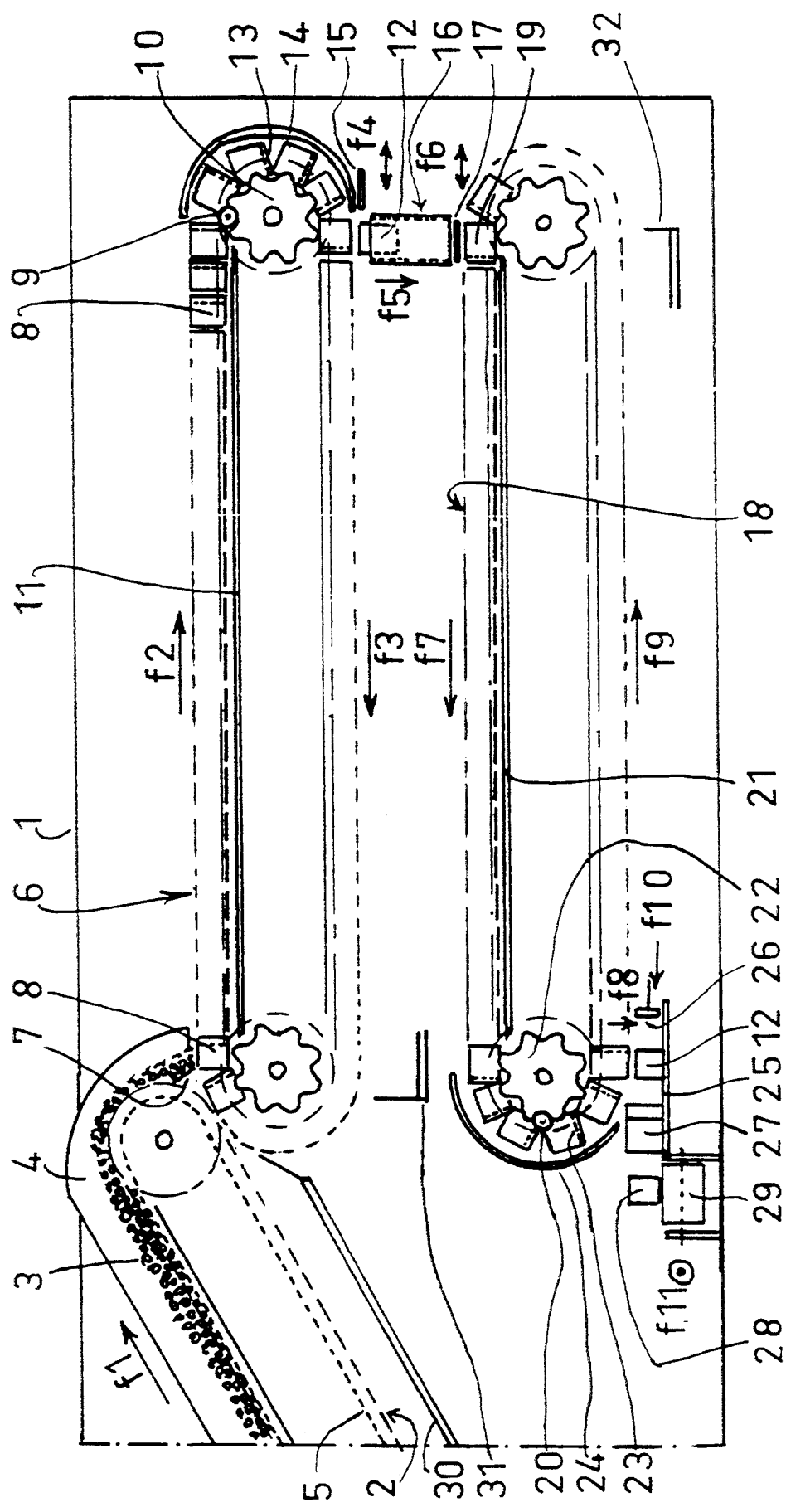
FIG. 1 diagrammatically illustrates the apparatus.

The apparatus comprises a closed enclosure 1 which completely surrounds a first endless elevating chain conveyor 2 which transports the curd in the form of grains 3 freed beforehand from whey, the curd having been formed by coagulation of milk and then cut.

The curd layer thus travels in the direction of the arrow f1 between fixed walls 4 situated on either side of a perforated belt 5. The layer of curd is then deposited onto the second horizontal conveyor 6 by way of the chute 7.

The second conveyor 6 comprises an endless chain of which the compartments 8 form the links. The compartments are coupled together and are driven via rollers 9 (of which only one has been shown in the interests of clarity of the drawing) by the sprocket wheel 10. The curd is deposited in the compartments 8 at the beginning of the chain and is transported in the direction of the arrow f2 without undergoing any vibration or jolting by virtue of the fact that the rollers 9 travel on the fixed runners 11. On reaching the end of the chain, the curd grains recombine into loaves under the effect of syneresis. The compartments 8 tip over to initiate the return of the chain flight in the direction of the arrow f3. During this operation, a loaf 12 is supported by the rear wall 13 of the compartment 8 and the curved guide plate 14 holds it until the chain follows the linear return path.

At the beginning of the return flight of the chain, the loaf 12 is inverted and initially rests on the retractable plate 15 which reciprocates in one direction of the arrow f4 so that it is in its advanced position, after which the plate is retracted into the position shown. The loaf 12 is thus released and falls through the guide tunnel 16 in the direction of the arrow f5, after which it is taken up by the retractable plate 17 which reciprocates in the direction of the arrow f6 which, in a first phase, is in its advanced position. The loaf 12 is then discharged by gravity onto the third horizontal conveyor 18 into the compartment 19 when the plate 17 is retracted.

The conveyor 18 comprises compartments 19 and is driven in the same way as the conveyor 6, but in the opposite direction (arrow f7) by means of rollers 20 (of which only one has been shown in the interests of clarity) travelling along the fixed runner 21 and taken up by the sprocket wheel 22. In this way, drainage of the loaves 12 continues until, at the end of the chain, the compartments 19 tip over and a loaf 12 is supported by the rear wall 23 of the compartment 19 and held by the curved guide plates 24 and is then discharged onto the table 25 in the direction of the arrow f8, and the return flight returns the empty compartments in the direction of the arrows f9. The pushers 26 advance in the direction of the arrow f10 and bring the loaves 12 into contact with the cutters 27 (fixed as shown or circular and rotary) which cut them into blocks 28 and push the blocks onto the endless conveyor belt 29. The blocks 28 are then removed transversely in the direction of the arrow f11 towards the stringing station (not shown). Gutters 30, 31 and 32 are positioned below the conveyors 2, 6 and 18 for collecting and removing the whey.

Figure 2:
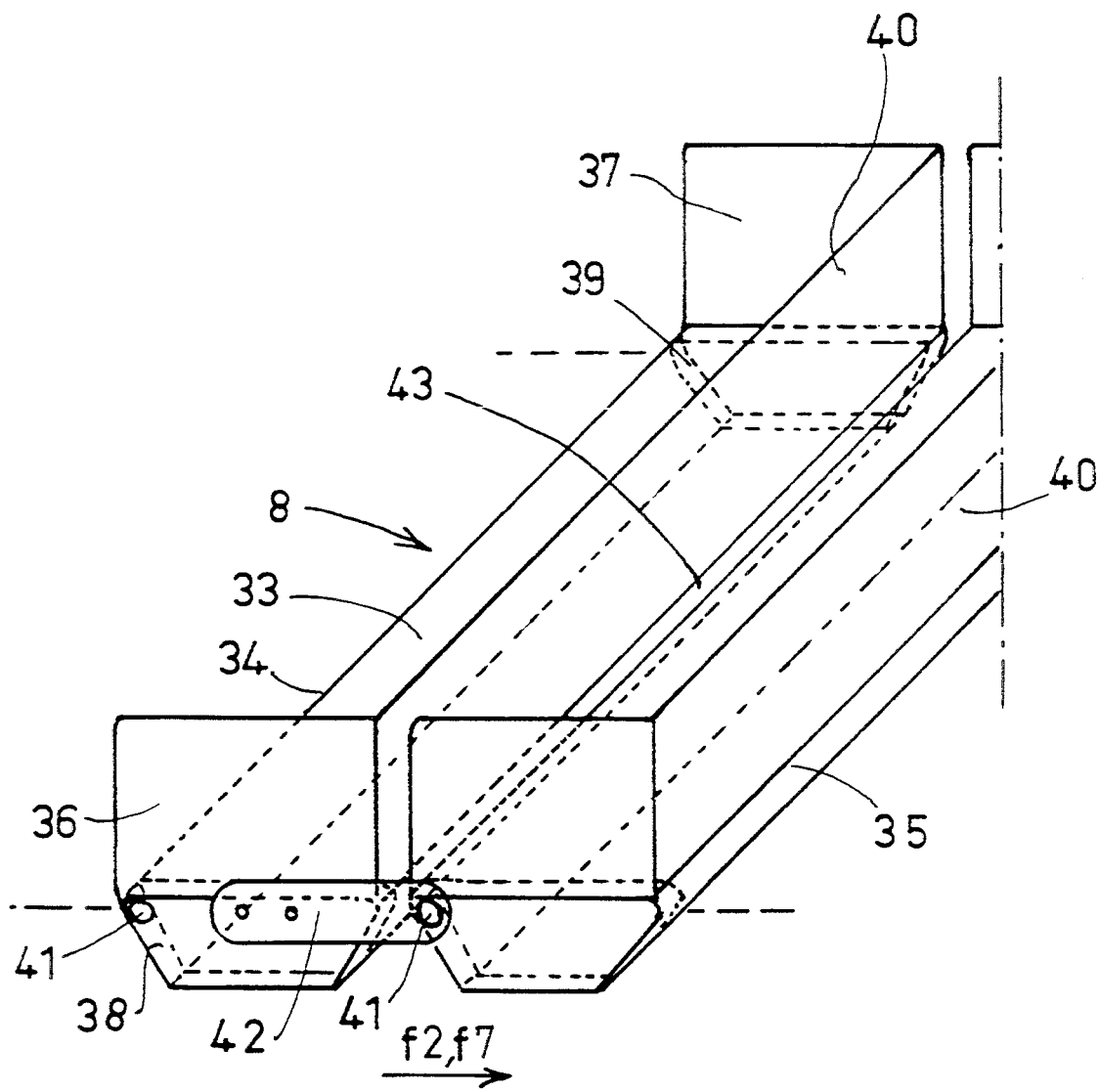
FIG. 2 is a perspective view of a compartment showing its arrangement in an endless chain.

Referring to FIG. 2, a compartment 8 generally parallelepipedic in shape comprises a base 33 consisting of a horizontal rectangular strip curved downwards at its long sides 34, 35. Vertical plates fixed to the strip on its short sides form the side walls 36 and 37 of the compartment. In that part which is situated below the plane of the strip, the side walls 36 and 37 are reinforced, in other words, they are extended by plates 38 and 39 thicker than that part which is situated above the plane of the strip. The compartment further comprises a vertical plate, adjacent the side walls 36 and 37 forming the rear wall relative to the direction of travel of the conveyors 6 and 18.

In a chain, a compartment is mounted to pivot about the pivot axis 41 which is also the axis of the associated roller (not shown in the interests of clarity of the drawing). A compartment is thus connected on each side to the preceding compartment by a connecting element 42 integral with the plate 38 (only the front pivotal connection is shown) so that there is a slot 43 between two compartments through which the whey flows. The back of the rear wall 40 of a compartment forms the front wall of the preceding compartment relative to the direction of travel of the chain. This arrangement facilitates the flow of the whey formed during drainage through the slot 43 by the wall effect.

We claim:

1. A process for preparing a cheese comprising:
   introducing curd grains into a conveyor compartment suitable for statically containing the grains and for statically draining the grains while transporting the compartment; and
   transporting the compartment containing the grains and statically draining the grains for a time for draining, syneresis and forming of the grains into a loaf.

2. A process according to claim 1 further comprising transporting the grain-containing-loaf-forming compartment and pre-cheese loaf to invert the loaf-forming compartment and loaf, transferring the inverted loaf into a second conveyor compartment which is positioned beneath the inverted loaf and which is suitable for statically containing the inverted loaf and for statically draining the inverted loaf while transporting the second compartment, and transporting the second compartment containing the inverted loaf and statically draining the inverted loaf for a time for draining the inverted loaf and then discharging the inverted loaf from the second compartment.

3. A process according to claim 2 wherein the compartment containing the grains and the second compartment containing the loaf are transported in opposite horizontal directions.

4. A process according to claim 2 further comprising, during transport of the pre-cheese loaf to invert the loaf, supporting the loaf to retain the loaf in the loaf-forming compartment.

5. A process according to claim 4 further comprising, upon inversion of the loaf, reciprocating a plate in a first direction to support the inverted loaf in the loaf-forming compartment and then in a second direction to release the inverted loaf from the loaf-forming compartment.

6. A process according to claim 5 further comprising reciprocating a second plate in a first direction to support the inverted loaf released from the loaf-forming compartment and then in a second direction to release the supported inverted loaf into the second compartment.

7. A process according to claim 1 wherein the pre-cheese is suitable for stringing.

8. A process according to claim 1 wherein the pre-cheese is a Mozzarella pre-cheese.

* * * * *

UNITED STATES PATENT AND TRADEMARK OFFICE
CERTIFICATE OF CORRECTION

PATENT NO. : 5,384,137
DATED : January 24, 1995
INVENTOR(S) : Giuseppe F. BOLIOLI, et al.

It is certified that error appears in the above-indentified patent and that said Letters Patent is hereby corrected as shown below:

Column 1, lines 15-16, "Streptococcus Thermophilus" should be italicized.

Signed and Sealed this

Ninth Day of May, 1995

Attest:

BRUCE LEHMAN

*Attesting Officer*      *Commissioner of Patents and Trademarks*